(12) United States Patent
Belsley

(10) Patent No.: US 8,891,566 B2
(45) Date of Patent: *Nov. 18, 2014

(54) SYSTEM AND METHOD FOR PROVIDING CHIRPED ELECTROMAGNETIC RADIATION

(75) Inventor: Kendall L. Belsley, Falls Church, VA (US)

(73) Assignee: Digital Signal Corporation, Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/329,595

(22) Filed: Dec. 19, 2011

(65) Prior Publication Data

US 2012/0189027 A1 Jul. 26, 2012

Related U.S. Application Data

(63) Continuation of application No. 11/353,124, filed on Feb. 14, 2006, now Pat. No. 8,081,670.

(51) Int. Cl.

| H01S 3/10 | (2006.01) |
|---|---|
| H01S 3/00 | (2006.01) |
| G01S 7/484 | (2006.01) |
| G01S 17/10 | (2006.01) |
| H01S 3/11 | (2006.01) |
| H01S 3/23 | (2006.01) |
| H01S 3/106 | (2006.01) |
| G02F 1/11 | (2006.01) |

(52) U.S. Cl.
CPC ............... *G01S 7/484* (2013.01); *H01S 3/0057* (2013.01); *H01S 3/1103* (2013.01); *G02F 2203/25* (2013.01); *G02F 2203/15* (2013.01); *G01S 17/102* (2013.01); *H01S 3/235* (2013.01); *H01S 3/1062* (2013.01); *G02F 1/11* (2013.01)
USPC ............... 372/28; 372/10; 372/11; 372/12; 372/13; 372/94; 356/482; 356/486

(58) Field of Classification Search
USPC ............ 372/10, 11, 12, 13, 28, 94; 356/482, 356/486
See application file for complete search history.

(56) References Cited

U.S. PATENT DOCUMENTS

| 3,363,248 A | 1/1968 | Nicodemus |
| 3,611,182 A | 10/1971 | Treacy |

(Continued)

FOREIGN PATENT DOCUMENTS

| DE | 102005046130 | 3/2007 |
| EP | 0 601 847 | 6/1994 |

(Continued)

OTHER PUBLICATIONS

EP Search Report dated Oct. 6, 2011 issued in related EP Application (No. 11174528.7).

(Continued)

*Primary Examiner* — Julio J Maldonado
*Assistant Examiner* — Joshua King
(74) *Attorney, Agent, or Firm* — Toering Patents PLLC

(57) ABSTRACT

A system and method for controllably chirping electromagnetic radiation from a radiation source includes an optical cavity arrangement. The optical cavity arrangement enables electromagnetic radiation to be produced with a substantially linear chirp rate and a configurable period. By selectively injecting electromagnetic radiation into the optical cavity, the electromagnetic radiation may be produced with a single resonant mode that is frequency shifted at the substantially linear chirp rate. Producing the electromagnetic radiation with a single resonant mode may increase the coherence length of the electromagnetic radiation, which may be advantageous when the electromagnetic radiation is implemented in various applications. For example, the electromagnetic radiation produced by the optical cavity arrangement may enhance a range, speed, accuracy, and/or other aspects of a laser radar system.

13 Claims, 8 Drawing Sheets

(56) References Cited

U.S. PATENT DOCUMENTS

| | | |
|---|---|---|
| 4,100,498 A | 7/1978 | Alsup et al. |
| 4,153,900 A | 5/1979 | Novak et al. |
| 4,272,193 A | 6/1981 | Eastman et al. |
| 4,314,210 A | 2/1982 | Everett |
| 4,319,807 A | 3/1982 | Horton |
| 4,333,080 A | 6/1982 | Collins et al. |
| 4,339,954 A | 7/1982 | Anson et al. |
| 4,532,603 A | 7/1985 | Gerard |
| 4,578,677 A | 3/1986 | Lewis |
| 4,662,741 A | 5/1987 | Duvall, III et al. |
| 4,664,129 A | 5/1987 | Helzel et al. |
| 4,666,295 A | 5/1987 | Duvall, III et al. |
| 4,697,888 A | 10/1987 | Schmadel, Jr. et al. |
| 4,743,110 A | 5/1988 | Arnaud et al. |
| 4,830,486 A | 5/1989 | Goodwin |
| 4,849,760 A | 7/1989 | Solie |
| 4,945,916 A | 8/1990 | Kretschmer et al. |
| 4,983,979 A | 1/1991 | McKenzie |
| 5,101,291 A * | 3/1992 | Jopson .................... 398/79 |
| 5,106,192 A | 4/1992 | Tucker et al. |
| 5,107,846 A | 4/1992 | Atlas |
| 5,283,795 A | 2/1994 | Fink |
| 5,289,252 A | 2/1994 | Nourrcier |
| 5,298,962 A | 3/1994 | Nourrcier |
| 5,339,084 A | 8/1994 | Watanabe et al. |
| 5,371,587 A | 12/1994 | De Groot et al. |
| 5,428,361 A | 6/1995 | Hightower et al. |
| 5,508,759 A | 4/1996 | Konishi et al. |
| 5,521,930 A * | 5/1996 | Suni et al. ................. 372/13 |
| 5,632,742 A | 5/1997 | Frey et al. |
| 5,644,642 A | 7/1997 | Kirschbaum |
| 5,647,360 A | 7/1997 | Bani-Hasheimi et al. |
| 5,715,166 A | 2/1998 | Besl et al. |
| 5,781,295 A | 7/1998 | Fuchs et al. |
| 5,903,358 A | 5/1999 | Zare et al. |
| 5,949,546 A | 9/1999 | Lee et al. |
| 6,062,216 A | 5/2000 | Corn |
| 6,080,990 A | 6/2000 | Watanabe et al. |
| 6,120,461 A | 9/2000 | Smyth |
| 6,191,862 B1 | 2/2001 | Swanson et al. |
| 6,328,698 B1 | 12/2001 | Matsumoto |
| 6,390,978 B1 | 5/2002 | Irion et al. |
| 6,418,158 B1 | 7/2002 | Vishwanath et al. |
| 6,445,942 B1 | 9/2002 | Berthon-Jones et al. |
| 6,533,729 B1 | 3/2003 | Khair et al. |
| 6,556,854 B1 | 4/2003 | Sato et al. |
| 6,573,982 B1 | 6/2003 | Pruitt |
| 6,594,200 B2 | 7/2003 | Nakamura |
| 6,606,052 B1 | 8/2003 | Miyahara |
| 6,674,773 B1 * | 1/2004 | Cotteverte et al. ............ 372/6 |
| 6,690,965 B1 | 2/2004 | Riaziat et al. |
| 6,839,363 B2 * | 1/2005 | Lin et al. ..................... 372/18 |
| 6,856,723 B1 * | 2/2005 | Ito et al. ..................... 385/27 |
| 6,871,084 B1 | 3/2005 | Kingsley et al. |
| 6,988,661 B2 | 1/2006 | Tsikos et al. |
| 7,089,796 B2 | 8/2006 | Pepper et al. |
| 7,128,714 B1 | 10/2006 | Antonelli et al. |
| 7,507,203 B2 | 3/2009 | Sebastian et al. |
| 7,511,824 B2 * | 3/2009 | Sebastian et al. ............ 356/486 |
| 7,699,469 B2 | 4/2010 | Sebastian et al. |
| 8,081,670 B2 * | 12/2011 | Belsley ......................... 372/28 |
| 2001/0009458 A1 | 7/2001 | Asaka et al. |
| 2002/0016533 A1 | 2/2002 | Marchitto et al. |
| 2002/0024331 A1 | 2/2002 | Lewis et al. |
| 2003/0023171 A1 | 1/2003 | Sato et al. |
| 2003/0034387 A1 | 2/2003 | Knowles et al. |
| 2003/0035461 A1 | 2/2003 | Tsikos et al. |
| 2003/0043467 A1 | 3/2003 | Rosenfeldt |
| 2003/0052169 A1 | 3/2003 | Tsikos et al. |
| 2003/0080190 A1 | 5/2003 | Tsikos et al. |
| 2003/0080192 A1 | 5/2003 | Tsikos et al. |
| 2003/0089778 A1 | 5/2003 | Tsikos et al. |
| 2003/0102379 A1 | 6/2003 | Tsikos et al. |
| 2003/0218070 A1 | 11/2003 | Tsikos et al. |
| 2004/0019282 A1 | 1/2004 | Mullen et al. |
| 2004/0024313 A1 | 2/2004 | Moriya et al. |
| 2004/0133079 A1 | 7/2004 | Mazar et al. |
| 2004/0160995 A1 * | 8/2004 | Sauter et al. ................. 372/25 |
| 2004/0257581 A1 | 12/2004 | Hogan |
| 2004/0260158 A1 | 12/2004 | Hogan |
| 2005/0024586 A1 | 2/2005 | Teiwes et al. |
| 2005/0030520 A1 | 2/2005 | Wada et al. |
| 2005/0033200 A1 | 2/2005 | Soehren et al. |
| 2005/0117160 A1 * | 6/2005 | Bonnet et al. ................. 356/489 |
| 2005/0119560 A1 | 6/2005 | Mostafavi |
| 2005/0182518 A1 | 8/2005 | Karlsson |
| 2005/0271109 A1 | 12/2005 | Knowles et al. |
| 2006/0056480 A1 * | 3/2006 | Mielke et al. ................. 372/94 |
| 2006/0072014 A1 | 4/2006 | Geng et al. |
| 2006/0109479 A1 | 5/2006 | Tai et al. |
| 2006/0182383 A1 * | 8/2006 | Slotwinski .................... 385/12 |
| 2006/0268950 A1 * | 11/2006 | Kane .......................... 372/30 |
| 2007/0109177 A1 | 5/2007 | Baath et al. |
| 2007/0171367 A1 | 7/2007 | Sebastian et al. |
| 2008/0181487 A1 | 7/2008 | Hsu et al. |
| 2010/0271615 A1 | 10/2010 | Sebastian et al. |
| 2011/0181704 A1 | 7/2011 | Gordon et al. |

FOREIGN PATENT DOCUMENTS

| | | |
|---|---|---|
| EP | 0 389 720 | 3/1995 |
| EP | 1 346 691 | 9/2003 |
| JP | 5-281342 | 10/1993 |
| JP | 3142364 | 12/2000 |
| JP | 2003-270336 | 9/2003 |
| NL | 9401514 A | 5/1996 |
| WO | WO 95/27453 | 10/1995 |
| WO | WO 99/18868 | 4/1999 |
| WO | WO 00/31899 | 6/2000 |
| WO | WO 03/105678 | 12/2003 |

OTHER PUBLICATIONS

Extended EP Search Report dated Aug. 9, 2011 issued in corresponding EP Application (No. 6848645.5).

Search Report dated Nov. 23, 2012 issued in corresponding/related CN application (No. 201080014736.4).

* cited by examiner

SYSTEM AND METHOD FOR PROVIDING CHIRPED ELECTROMAGNETIC RADIATION

CROSS-REFERENCE TO RELATED APPLICATIONS

This is a continuation of U.S. application Ser. No. 11/353,124 filed Feb. 14, 2006, now U.S. Pat. No. 8,081,670.

FIELD OF THE INVENTION

The invention relates to electromagnetic radiation sources and more particularly to systems and methods for providing chirped electromagnetic radiation.

BACKGROUND OF THE INVENTION

Various measuring devices for measuring linear distances using one or more laser radars are known. Such measuring devices may generate information related to a distance or range of a target from the measuring device and/or a velocity, or range rate, of the target relative to the measuring device. This range and range rate information may be useful in a variety of settings. For the purposes of this application the term range rate refers to the rate of change in the range between the target and the measuring device.

A typical measuring device may include, for example, a frequency modulated laser radar system. The system may include a laser source that emits a beam of electromagnetic radiation. The beam may be emitted at a frequency that is continuously varied, or chirped. In some instances, chirping the frequency may include sweeping the frequency between a lower frequency and an upper frequency (or vice versa) in a periodic manner (e.g. a sawtooth waveform, a triangle waveform, etc.). The beam may be divided into a target beam and a reference beam.

In conventional embodiments, the system may include a target interferometer and a reference interferometer. The target interferometer may receive the target beam, and may generate a target signal corresponding to a frequency difference between one portion of the target beam directed towards, and reflected from, the target, and another portion of the target beam directed over a path with a known or otherwise fixed path length. The frequency difference may be determined by the target interferometer based on an interference signal derived from the two portions of the target beam. The reference interferometer may receive the reference beam and may generate a reference signal corresponding to a frequency difference between two portions of the reference beam that may be directed over two separate fixed paths with a known path length difference. The frequency difference may be determined by the reference interferometer based on an interference signal derived from the two portions of the reference beam.

Generally, the system may include a processor. The processor may receive the target signal and the reference signal and may process these signals to determine the range between the target interferometer and the target. Range information determined based on the target signal and the reference signal may be used to determine a range rate of the target with respect to the target interferometer.

Conventional systems may be built, for example, as described in U.S. Pat. No. 5,114,226, entitled "3-DIMENSIONAL VISION SYSTEM UTILIZING COHERENT OPTICAL DETECTION," which is incorporated herein by reference in its entirety.

Conventional systems are typically limited in various aspects of operation. For example, these conventional systems are not able to provide range and/or range rate information instantaneously based on the target signal and reference signal, or unambiguously determine distance and velocity. These conventional systems are limited in other ways as well. These limitations may be exacerbated by various operating conditions such as, for example, target acceleration toward or away from the target interferometer, using an actuated optical element (e.g. a mirror or lens) to scan the target at high speeds, or other operating conditions.

In some configurations, beams produced by two laser sources may be combined to provide a beam of electromagnetic radiation that may then be divided into a reference beam and a target beam. In these configurations, the frequencies of the two laser sources may be counter chirped, or, in other words, the two frequencies may be chirped such that while a frequency of one of the laser sources is ascending toward an upper frequency, the other is descending toward a lower frequency, and vice versa. Systems utilizing such a configuration may suffer some or all of the drawbacks associated with single laser source systems, as well as other drawbacks unique to two laser source systems. Additionally, conventional systems may not enable sufficient control over the frequency of emitted electromagnetic radiation to suitably manipulate the chirp rate of the radiation, may not be capable of chirping the frequency of emitted electromagnetic radiation in a sufficiently linear manner, or include other drawbacks.

SUMMARY

One aspect of the invention may relate to a system and method for controllably chirping electromagnetic radiation from a radiation source. The system and method may include an optical cavity arrangement that enables electromagnetic radiation to be produced with a substantially linear chirp rate and a configurable period. By selectively injecting electromagnetic radiation into the optical cavity, the electromagnetic radiation may be produced with a single resonant mode that is frequency shifted at the substantially linear chirp rate. Producing the electromagnetic radiation with a single resonant mode may increase the coherence length of the electromagnetic radiation, which may be advantageous when the electromagnetic radiation is implemented in various applications. For example, the electromagnetic radiation produced by the optical cavity arrangement may enhance a range, speed, accuracy, and/or other aspects of a laser radar system.

In some embodiments of the invention, a system may include radiation source, one or more optical elements that form an optical cavity, a frequency shifter, an optical switch and an optical amplifier. The system may be implemented to provide chirped electromagnetic radiation to a coherent laser radar device, a spectral analysis device, an interferometer, a remote sensing device, or another device.

In some embodiments, the frequency shifter may be disposed within the optical cavity to receive electromagnetic radiation from the optical cavity, and to output a frequency shifted portion of the received electromagnetic radiation back to the optical cavity. The optical switch may be disposed within the optical cavity to receive electromagnetic radiation from the optical cavity. The optical switch may be controllable to either dump the received electromagnetic radiation away from the optical cavity, or to return the received electromagnetic radiation back to the optical cavity. In some instances, the optical switch may be controllable to couple radiation from the radiation source to the optical cavity while dumping the received electromagnetic radiation away from the optical cavity, the radiation from the source being received at the optical switch at an initial frequency. Dumping the electromagnetic radiation received from the optical cavity while coupling radiation from the radiation source to the optical cavity may reset the frequency of the electromagnetic radiation within the optical cavity to the initial frequency.

In some embodiments, a quality factor of the optical cavity may be degraded by various losses within the optical cavity. For example, radiation output from the optical cavity to a device may constitute a loss. Other losses may also be present, such as losses to imperfections in the optical elements, or other parasitic losses. To combat the degradation of the quality factor, system components may be selected and/or the system configuration may be designed to reduce cavity losses. Cavity losses may also reduce the energy stored within the optical cavity and/or the power output from the optical cavity. To combat cavity losses, an optical amplifier may be disposed within the optical cavity. The optical amplifier may be selected to provide enough gain to radiation within the optical cavity to overcome the sum of the cavity losses so that an intensity of radiation output from the optical cavity may be maintained, forming an optical oscillator or laser. The optical amplifier may also be selected based on one or more other specifications, such as, for example, homogeneous line width, gain bandwidth, or other specifications.

One aspect of various embodiments of the invention may relate to a laser radar system that unambiguously detects a range of a target and a range rate at which the target is moving relative to the laser radar system. Another aspect of various embodiments of the invention may relate to a laser radar system that uses multiple laser radar sections to obtain multiple simultaneous measurements (or substantially so), whereby both range and range rate can be determined without various temporal effects introduced by systems employing single laser sections taking sequential measurements. In addition, other aspects of various embodiments of the invention may enable faster determination of the range and rate of the target, a more accurate determination of the range and rate of the target, and/or may provide other advantages.

In some embodiments of the invention, the laser radar system may emit a first target beam and a second target beam toward a target. The first target beam and the second target beam may be reflected by the target back toward the laser radar system. The laser radar system may receive the reflected first target beam and second target beam, and may determine at least one of a range of the target from the laser radar system, and a range rate of the target. In some embodiments of the invention, the laser radar system may include a first laser radar section, a second laser radar section, and a processor.

In some embodiments of the invention, the first laser radar section may generate a first target beam and a first reference beam. The first target beam and the first reference beam may be generated by a first laser source at a first frequency that may be modulated at a first chirp rate. The first target beam may be directed toward a measurement point on the target. The first laser radar section may combine one portion of the first target beam that may be directed towards, and reflected from, the target with another portion of the first target beam, referred to as a local oscillator beam, directed over a path with a known or otherwise fixed path length. This may result in a combined first target beam.

According to various embodiments of the invention, the second laser radar section may be collocated and fixed with respect to the first laser radar section. More particularly, the relevant optical components for transmitting and receiving the respective laser beams are collocated and fixed. The second laser radar section may generate a second target beam and a second reference beam. The second target beam and the second reference beam may be generated by a second laser source at a second frequency that may be modulated at a second chirp rate. The second chirp rate may be different from the first chirp rate. This may facilitate one or more aspects of downstream processing, such as, signal discrimination, or other aspects of downstream processing. The second target beam may be directed toward the same measurement point on the target as the first target beam. The second laser radar section may combine one portion of the second target beam directed towards, and reflected from, the target, and another portion of the second target beam directed over a path with a known or otherwise fixed path length. This results in a combined second target beam.

According to various embodiments of the invention, the processor receives the first and second combined target beams and measures a beat frequency caused by a difference in path length between each of the respective reflected target beams and its corresponding local oscillator beam, and by any Doppler frequency shift created by target motion relative to the laser radar system. The beat frequencies may then be combined linearly to generate unambiguous determinations of the range and the range rate of the target, so long as the beat frequencies between each of the respective local oscillator beams and the its reflected target beam correspond to simultaneous (or substantially simultaneous) temporal components of the reflected target beams. Simultaneous (or substantially simultaneous) temporal components of the reflected target beams may include temporal components of the target beams that: 1) have been incident on substantially the same portion of the target, 2) have been impacted by similar transmission effects, 3) have been directed by a scanning optical element under substantially the same conditions, and/or 4) share other similarities. The utilization of beat frequencies that correspond to simultaneous (or substantially simultaneous) temporal components of the reflected target beams for linear combination may effectively cancel any noise introduced into the data by environmental or other effects (see e.g. Equation (1)).

Since the combined target beams may be created by separately combining the first local oscillator beam and the second local oscillator beam with different target beams, or different portions of the same target beam, the first combined target beam and the second combined target beam may represent optical signals that would be present in two separate, but coincident, single source frequency modulated laser radar systems, just prior to final processing. For example, the combined target beams may represent optical signals produced by target interferometers in single source systems.

According to various embodiments, the target beams may be directed to and/or received from the target on separate optical paths. In some embodiments, these optical paths may be similar but distinct. In other embodiments the first target beam and the second target beam may be coupled prior to emission to create a combined target beam directed toward the target along a common optical path. In some embodiments, the target beam may be reflected by the target and may be received by the laser radar system along a reception optical path separate from the common optical path that directed the target beam toward the target. Such embodiments may be labeled "bistatic." Or, the combined target beam may be received by the laser radar system along the common optical path. These latter embodiments may be labeled "monostatic." Monostatic embodiments may provide advantages over their bistatic counterparts when operating with reciprocal optics.

More particularly, monostatic embodiments of the invention are less affected by differential Doppler effects and distortion due to speckle, among other things. Differential Doppler effects are created, for example, by a scanning mirror that directs the target beam to different locations on a target. Since different parts of the mirror are moving at different velocities, different parts of the target beam experience different Doppler shifts, which may introduce errors into the range and or range rate measurements. These effects have been investigated and analyzed by Anthony Slotwinski and others, for example, in NASA Langley Contract No. NAS1-18890 (May 1991) Phase II Final Report, Appendix K, submitted by Digital Signal Corporation, 8003 Forbes Place, Springfield, Va. 22151, which is incorporated herein by reference in its entirety.

In some instances, the first laser source and the second laser source may generate electromagnetic radiation at a first carrier frequency and a second carrier frequency, respectively. The first carrier frequency may be substantially the same as the second carrier frequency. This may provide various enhancements to the laser radar system, such as, for example, minimizing distortion due to speckle, or other enhancements.

In some embodiments, the first laser source and the second laser source may rely on, or employ, highly linearized components to generate their respective laser beams. To this end, the first laser source and the second laser source may be linearized on a frequent basis (e.g. each chirp), or in some embodiments continuously (or substantially so). This linearization may provide enhanced range measurement accuracy, or other enhancements, over conventional systems in which linearization may occur at startup, when an operator notices degraded system performance, when the operator is prompted to initiate linearization based on a potential for degraded performance, or when one or more system parameters fall out of tolerance, etc. Frequent and/or automated linearization may reduce mirror differential Doppler noise effects during high speed scanning and may maximize the effectiveness of dual chirp techniques for canceling out these and other noise contributions to range estimates.

In some embodiments of the invention, the laser radar system may determine the range and the range rate of the target with an increased accuracy when the range of the target from the laser radar system falls within a set of ranges between a minimum range and a maximum range. When the range of the target does not fall within the set of ranges, the accuracy of the laser radar system may be degraded. This degradation may be a result of the coherence length(s) of the first laser source and the second laser source, which is finite in nature. For example, the distance between the minimum range and the maximum range may be a function of the coherence length. The longer the coherence length of the first laser source and the second laser source, the greater the distance between the minimum range and the maximum range. Thus, increasing the coherence length of the first laser source and the second laser source may enhance range and range rate determinations by the laser radar system by providing the ability to make determinations over an enhanced set of ranges.

In some embodiments of the invention, one or both of the first laser source and the second laser source may implement a system and method for controllably chirping electromagnetic radiation from a radiation source, as described herein. The system and method may enable electromagnetic radiation to be produced at a substantially linear chirp rate with a configurable period. In some embodiments, the radiation may include a single, frequency shifted, resonant mode.

In some embodiments of the invention, one of the chirp rates may be set equal to zero. In other words, one of the laser sources may emit radiation at a constant frequency. This may enable the laser source emitting at a constant frequency to be implemented with a simpler design, a small footprint, a lighter weight, a decreased cost, or other enhancements that may provide advantages to the overall system. In these embodiments, the laser radar section with chirp rate set equal to zero may be used to determine only the range rate of the target.

In some embodiments of the invention, the processor may linearly combine the first combined target beam and the second combined target beam digitally to generate the range signal and the range rate signal. For example, the processor may include a first detector and a second detector. The first detector may receive the first combined target beam and may generate a first analog signal that corresponds to the first combined target beam. The first analog signal may be converted to a first digital signal by a first converter. The processor may include a first frequency data module that may determine a first set of frequency data that corresponds to one or more frequency components of the first digital signal.

The second detector may receive the second combined target beam and may generate a second analog signal that corresponds to the second combined target beam. The second analog signal may be converted to a second digital signal by a second converter. The processor may include a second frequency data module that may determine a second set of frequency data that corresponds to one or more of frequency components of the second digital signal.

The first set of frequency data and the second set of frequency data may be received by a frequency data combination module. The frequency data combination module may generate a range rate signal and a range signal derived from the first set of frequency data and the second set of frequency data.

In other embodiments of the invention, the processor may mix the first combined target beam and the second combined target beam electronically to generate the range signal and the range rate signal. For example, the processor may include a modulator. The modulator may multiply the first analog signal generated by the first detector and the second analog signal generated by the second detector to create a combined analog signal. In such embodiments, the processor may include a first filter and a second filter that receive the combined analog signal. The first filter may filter the combined analog signal to generate a first filtered signal. The first filtered signal may be converted by a first converter to generate a range rate signal. The second filter may filter the combined analog signal to generate a second filtered signal. The second filtered signal may be converted by a second converter to generate a range signal.

According to other embodiments of the invention, the processor may mix the first combined target beam and the second combined target beam optically to generate the range signal and the range rate signal. For example, the processor may include a detector that receives the first combined target beam and the second combined target beam and generates a combined analog signal based on the detection of the first combined target beam and the second combined target beam. In such embodiments, the processor may include a first filter and a second filter that receive the combined analog signal. The first filter may filter the combined analog signal to generate a first filtered signal. The first filtered signal may be converted by a first converter to generate a range rate signal. The second filter may filter the combined analog signal to generate a second filtered signal. The second filtered signal may be converted by a second converter to generate a range signal.

These and other objects, features, benefits, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION

Figure 1:
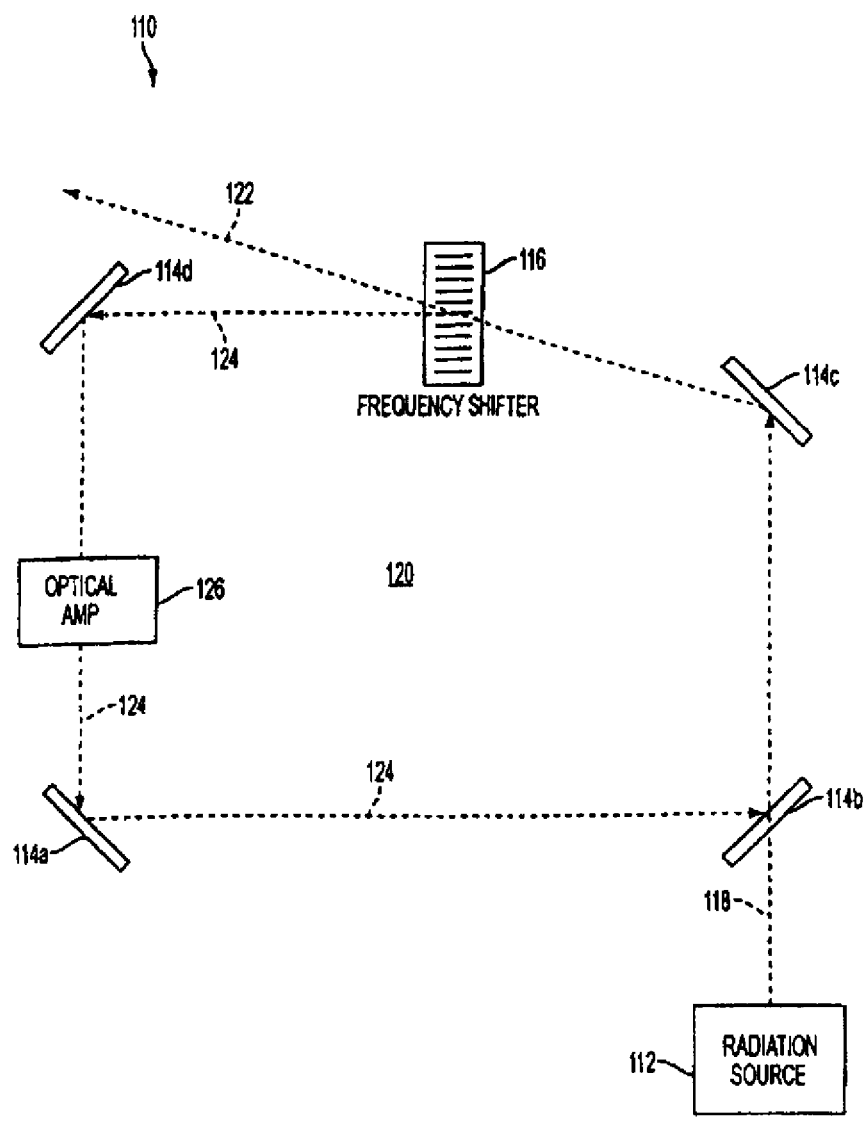
FIG. 1 illustrates a conventional system for providing electromagnetic radiation.

FIG. 1 illustrates a conventional system 110 for producing electromagnetic radiation at a frequency that is chirped at a substantially linear chirp rate. System 110 may include a radiation source 112, one or more optical elements 114 (illustrated as optical elements 114a-114d), and a frequency shifter 116. System 110 may be implemented to provide chirped electromagnetic radiation to a coherent laser radar device, a spectral analysis device, an interferometer, a remote sensing device, or another device.

In various conventional embodiments, radiation source 112 may provide a beam 118 of coherent electromagnetic radiation to system 110. Optical elements 114 may form an optical cavity 120, such as a ring cavity, for example. Beam 118 may be coupled to the optical cavity 120 to introduce the electromagnetic radiation that forms beam 118 into optical cavity 120. Frequency shifter 116 may be disposed in optical cavity 120 to receive the electromagnetic radiation, and may include a diffraction element (or elements) that diffract the electromagnetic radiation. Electromagnetic radiation that is zero-order diffracted by frequency shifter 116 may pass through frequency shifter 116 without being frequency shifted, and may form an output beam 122 of electromagnetic radiation that may be provided for use in one of the devices listed above. Diffracted electromagnetic radiation of an order other than the zero-order (e.g., the first order) may be frequency shifted by a predetermined (and in some cases adjustable) amount to form a frequency shifted beam 124 of electromagnetic radiation. Beams 124 and 118 may then be combined within optical cavity 120, and again be directed to frequency shifter 116. In this manner, frequency shifter 116 may incrementally shift the frequency of the resonant modes of electromagnetic radiation within optical cavity 120 at each pass through frequency shifter 116. These incremental shifts may cause the frequency of the electromagnetic radiation within optical cavity 120 (and output beam 122) to be chirped at a substantially linear rate.

In conventional embodiments, a quality factor of optical cavity 120 (defined as the ratio of energy stored to energy dissipated in the cavity) may be degraded by various losses within optical cavity 120. For example, radiation output from system 110 in output beam 122 may constitute a loss. Other losses may also be present, such as losses to imperfections in optical elements 114, or other parasitic losses. To combat the cavity losses, an optical amplifier 126 may be disposed within optical cavity 120. The optical amplifier 126 may be selected to provide enough gain to beam 124 to overcome the sum of the cavity losses so that an intensity of resonant modes contained within output beam 122 may be maintained. Optical amplifier 126 may also be selected based on one or more other specifications, such as, for example, homogeneous line width, gain bandwidth, or other specifications. Source 112 may be selected to emit electromagnetic radiation at a frequency that falls within a gain bandwidth of optical amplifier 126.

In conventional embodiments, the chirp rate at which the frequency of output beam 122 may be chirped may be controlled by a length of optical cavity 120, which may be adjusted by adjusting a configuration of optical elements 114. Another mechanism for controlling the chirp rate may include controlling the frequency shift applied to electromagnetic radiation within optical cavity 120 by frequency shifter 116. In some embodiments, frequency shifter 116 may include an acousto-optic Bragg cell that may be driven to apply a selectable frequency shift to electromagnetic radiation within optical cavity 120. An example of some conventional embodiments of a system for producing electromagnetic radiation at a frequency that is chirped at a substantially linear chirp rate including an optical cavity and a frequency shifter that includes an acousto-optic Bragg cell may be found in U.S. Pat. No. 4,697,888 to Schmadel et al., which is incorporated herein by reference.

In conventional embodiments, a mode of electromagnetic radiation within optical cavity 120 may be linearly chirped until the frequency of the mode is shifted so far that the frequency no longer falls within the gain bandwidth of optical amplifier 126. Once the frequency of the mode is outside of the gain bandwidth of optical amplifier 126, optical amplifier 126 may not provide a gain to the mode, so that losses within optical cavity 120 may cause the mode to die out. As modes die out in this manner, electromagnetic radiation introduced into optical cavity 120 in beam 114 may form new modes whose frequencies may then be linearly chirped by frequency shifter 116, until these modes also die out.

Figure 2:
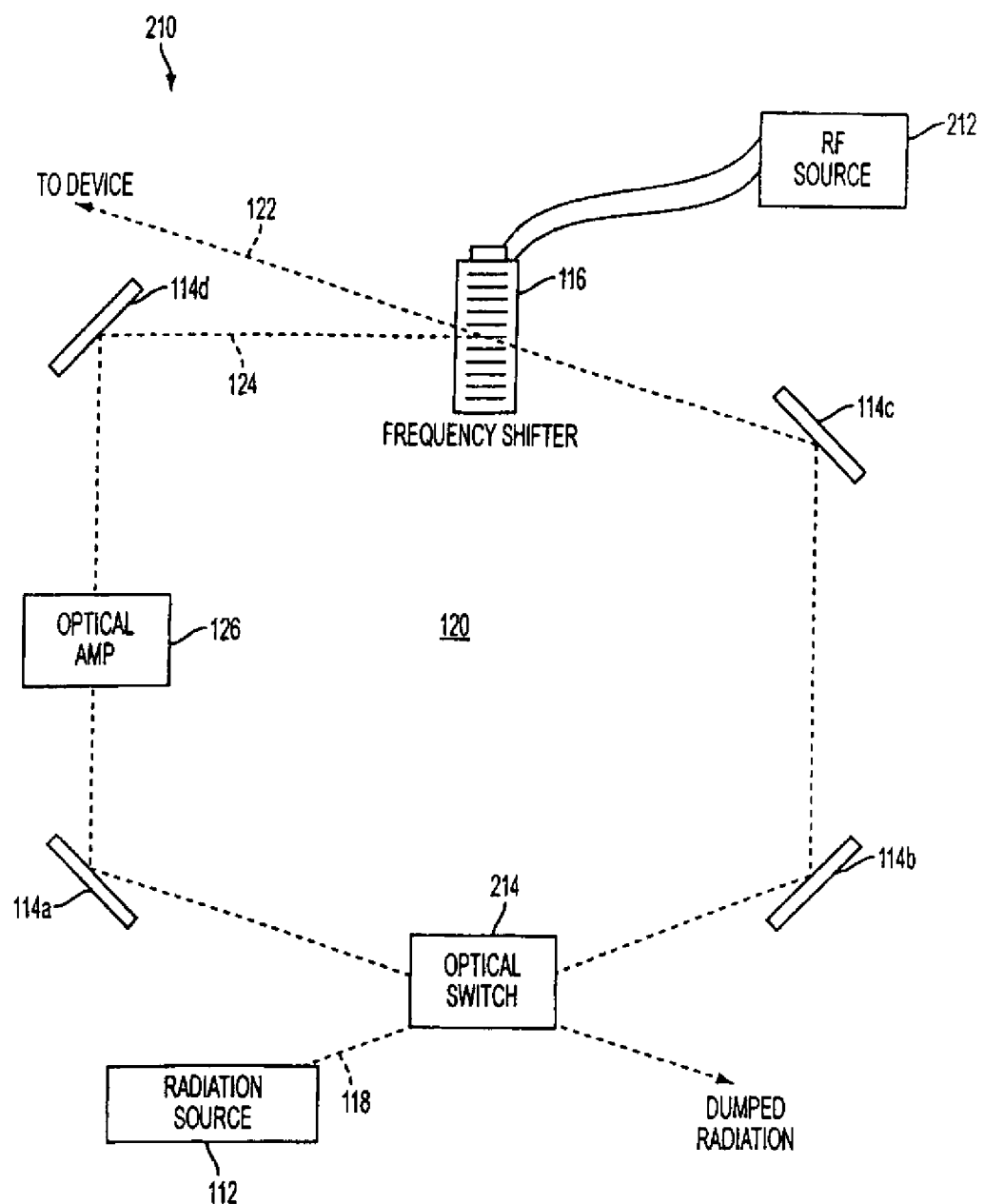
FIG. 2 illustrates a system for providing electromagnetic radiation according to one or more embodiments of the invention.

FIG. 2 is an exemplary illustration of a system 210 for producing electromagnetic radiation, in accordance with some embodiments of the invention. The electromagnetic radiation may be emitted by system 210 at a single mode, the frequency of which may be chirped at a substantially linear chirp rate. System 210 is illustrated with a configuration similar in some respects to system 110 of FIG. 1, and similar components may be labeled with the same reference numbers. For example, system 210 may include radiation source 112, one or more optical elements 114 (illustrated as optical elements 114a-114d) that form optical cavity 120, frequency shifter 116, and optical amplifier 126. As with system 110, system 210 may be implemented to provide chirped electromagnetic radiation to a coherent laser radar device, a spectral analysis device, an interferometer, a remote sensing device, or another device.

In some embodiments of the invention, radiation source 112 may provide beam 118 of coherent electromagnetic radiation to system 210; and optical elements 114 forming optical cavity 120, frequency shifter 116, and optical amplifier 126 may interact with the electromagnetic radiation therefrom. Beam 118 may be coupled to optical cavity 120. Frequency shifter 116 may be disposed in optical cavity 120 to receive the electromagnetic radiation, and may include, for example, an acousto-optic Bragg cell that may be driven by an RF source 212 to apply a configurable frequency shift to radiation within optical cavity 120. As may be the case with system 110, in system 210, zero-order diffracted electromagnetic radiation from frequency shifter 116 may pass through frequency shifter 116 without being frequency shifted, and may form output beam 122 of electromagnetic radiation that may be provided for use in one of the devices listed above. Diffracted electromagnetic radiation of an order (or orders) other than the zero-order (e.g., the first order) may be frequency shifted by a predetermined (and in some cases adjustable) amount to form frequency shifted beam 124 of electromagnetic radiation. Beam 124 may then again be directed to frequency shifter 116. In this manner, frequency shifter 116 may incrementally shift the frequency of one or more resonant modes present in the electromagnetic radiation within optical cavity 120 at each pass through frequency shifter 116. These incremental shifts may cause the frequency of the electromagnetic radiation within optical cavity 120 (and output beam 122) to be chirped at a substantially linear rate. To combat the degradation of the quality factor of optical cavity 120, optical amplifier 126 may be disposed within optical cavity 120 to provide a gain to electromagnetic radiation within optical cavity 120. Optical amplifier 126 may be selected based on one or more of the criteria provided above.

In some embodiments of the invention, system 210 may include an optical switch 214. Optical switch 214 may be disposed within optical cavity 120 to receive electromagnetic radiation within optical cavity 120 (e.g. beam 124), and from source 112, and may be selectively controllable to direct beams 118 and 124 such that one of beams 118 and 124 may be dumped away from optical cavity 120 while the other one of beams 118 and 124 may be coupled into optical cavity 120. This configuration may enable a single mode of linearly chirped electromagnetic radiation to be stored within, and emitted from, optical cavity 120. More particularly, optical switch 214 may enable electromagnetic radiation to be introduced to optical cavity 120 from source 112 at the emission frequency of source 112. For instance, optical switch 214 may enable beam 118 to be coupled into optical cavity 120 for a period of time that may correspond to an optical length of optical cavity 120. During this same period of time, switch 214 may dump energy from the cavity, replacing it with energy from radiation source 112. After an appropriate amount of radiation has been coupled into optical cavity 120, optical switch 214 may dump beam 118 away from optical cavity 120, and may couple electromagnetic radiation within optical cavity 120 (e.g., electromagnetic radiation included in beam 124) back into optical cavity 120. Provided that the amount of time that radiation was received from source 112 into optical cavity 120 was substantially equal to, or less than, the optical length of optical cavity 120, this may create a single resonant mode of radiation with optical cavity 120. As the mode of electromagnetic radiation contained within optical cavity 120 circulates about optical cavity 120 through frequency shifter 116, optical amplifier 126, and optical switch 214, the frequency of the mode is incrementally shifted by frequency shifter 116, causing a linear chirp of the frequency of the mode within optical cavity 120.

In some embodiments of the invention, optical switch 214 may enable the frequency of the electromagnetic radiation within optical cavity 120 to be reset. For example, an existing mode of radiation may be effectively extinguished by controlling optical switch 214 to dump radiation that has been circulating within optical cavity 120, or the existing mode of radiation having a shifted frequency, out of optical cavity 120. At the same time (or substantially so), a new mode of radiation may be begun by controlling optical switch 214 to couple beam 118 from source 112 into optical cavity 120 as the existing, or old, mode (beam 124) gets dumped. This may be conceptualized as emptying optical cavity 120 of the old mode of electromagnetic radiation having a shifted frequency, and introducing a new mode of electromagnetic radiation at the emission frequency of source 112 into optical cavity 120. When electromagnetic radiation from source 112 has been allowed to enter optical cavity 120 for an appropriate amount of time (e.g., the optical length of optical cavity 120), optical switch 214 may again be controlled to dump radiation included in beam 118 from source 112 away from optical cavity 120, and the new mode of radiation may be enabled to circulate through optical cavity 120.

Figure 3A:
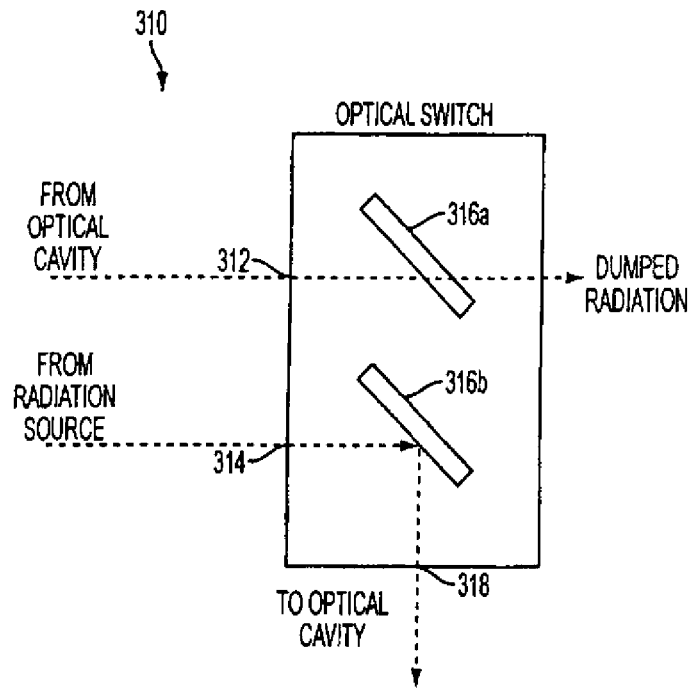
FIG. 3 illustrates an optical switch for implementation in a system for providing electromagnetic radiation according to one or more embodiments of the invention.
Figure 3B:
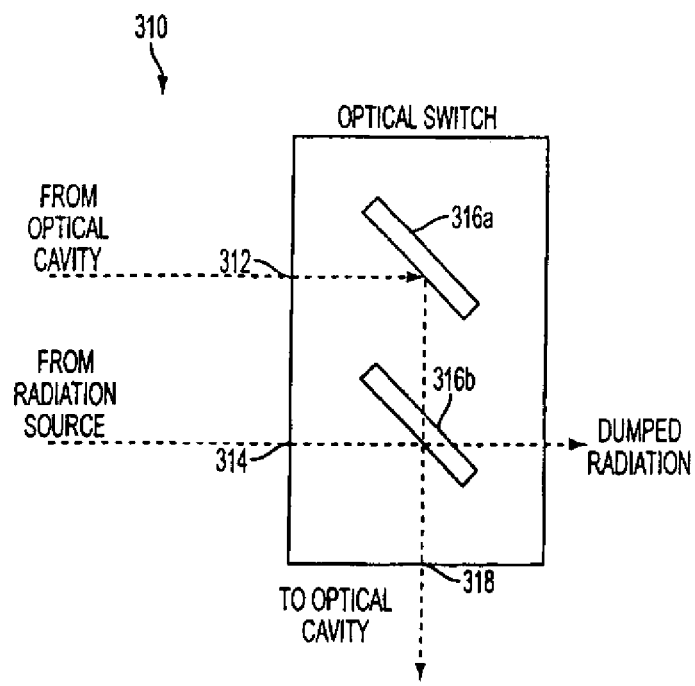

For demonstrative purposes, FIGS. 3A and 3B illustrate an optical switch 310, according to some embodiments of the invention. For example, optical switch 310 may include a micro electro-mechanical system (MEMS) switch. In such embodiments, optical switch 310 may include a cavity input 312 where optical switch 310 may receive electromagnetic radiation from an optical cavity, such as optical cavity 120, and a source input 314 where optical switch 310 may receive electromagnetic radiation from a radiation source, such as source 112. Optical switch 310 may include a plurality of movable optical members (e.g., micro-mirrors) 316 (illustrated as 316a and 316b). Movable optical members 316 may be controllably actuated into and out of the optical paths of radiation within optical switch 310 in the manner illustrated in FIGS. 3A and 3B to selectively guide one or the other (or both) of the electromagnetic radiation received at cavity input 312 or source input 314 to a cavity output 318, at which electromagnetic radiation may be guided into the optical cavity. Radiation not guided by movable optical members 316 to cavity output 318 may be dumped by optical switch 310 away from the optical cavity. In other embodiments of the invention, optical switch 310 (and 214) may include a non-mechanical, solid-state, optical switch, a Mach-Zender interferometer switch, an optical-electrical-optical switch, or other optical switches.

It may be appreciated that the configuration of system 210 is shown for illustrative purposes only, and that various alternatives and/or substitutions may be included without departing from the scope of the invention. For example, although frequency shifter 116 is illustrated as a diffractive acousto-optic Bragg cell, in number of frequency shifting components may be implemented. Similarly, optical members 114, illustrated in FIG. 2 as mirrors, may include an optical fiber, a mirror, a prism, or any other optical member capable of guiding electromagnetic radiation. In some embodiments, electromagnetic radiation may be output from system 210 at a point other than frequency shifter 116. For instance, one of optical elements 114 may include a half mirror that may enable output of radiation from optical cavity 120 for use in a device.

In some embodiments of the invention, electromagnetic radiation from source 112 may be coupled to optical cavity 120 without being received at optical switch 214, and source 112 may be configured to only provide radiation to optical cavity 120 when optical switch 214 dumps electromagnetic radiation received from optical cavity 120 out of optical cavity 120. For example, radiation may be received into optical cavity 120 from source 112 via a blocking member, or optical switch separate from optical switch 214, that may only enable radiation emitted from source 112 to be coupled to optical cavity 120 at appropriate times. In other embodiments, source 112 may only emit radiation when optical switch 214 dumps radiation out of optical cavity 120.

In some embodiments of the invention, system 210 may include one or more additional elements and/or components to provide additional enhancements to the system. For example, an optical diode may be incorporated into optical cavity 120 to insure that radiation propagates in a single direction within optical cavity 120. In some embodiments, optical filtering devices may be added that may restrict an amount of longitudinal modes in which source 112 may operate. One or more polarization elements may also be added to enhance an optical stability of system 210.

Figure 4:
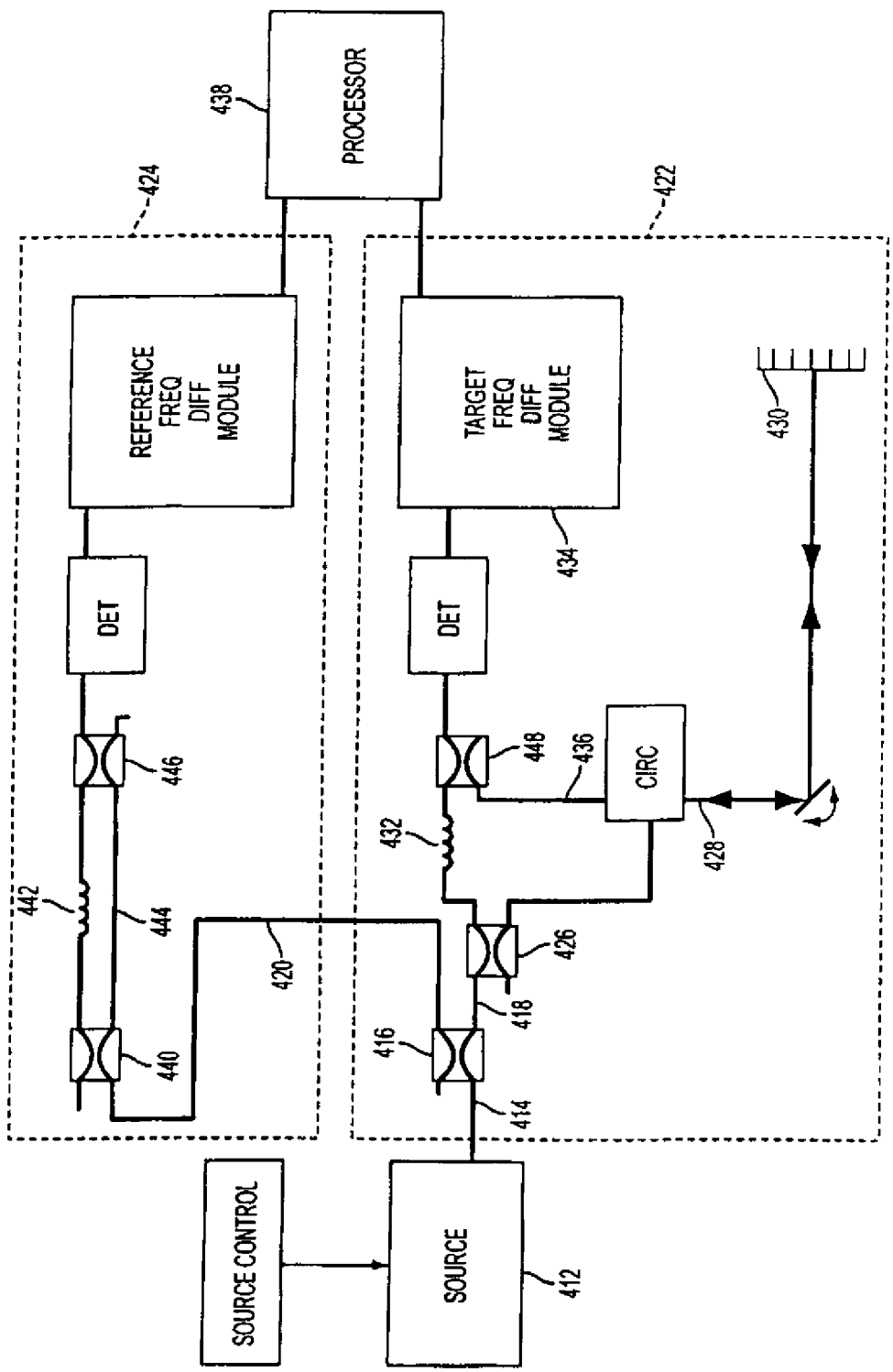
FIG. 4 illustrates a conventional laser radar system.

FIG. 4 illustrates a frequency modulated laser radar system 410. System 410 typically includes a laser source 412 that emits a beam 414 of electromagnetic radiation. Beam 414 may be emitted at a frequency that is continuously varied, or chirped. In some instances, chirping the frequency may include sweeping the frequency between a lower frequency and an upper frequency (or vice versa) in a periodic manner (e.g. a sawtooth waveform, a triangle waveform, etc.). Beam 414 may be divided by an optical coupler 416 into a target beam 418 and a reference beam 420.

According to various embodiments of the invention, laser source 412 may include system 210 described above. Providing system 210 in laser source 412 may enhance the operation of laser radar system 410 by increasing the coherence length of electromagnetic radiation used by laser radar system 410 to determine range and/or range rate information. For example, increased coherence length of the electromagnetic radiation may enhance a range, speed, accuracy, and/or other aspects of laser radar system 410.

In some embodiments, system 410 may include a target interferometer 422 and a reference interferometer 424. Target interferometer 422 may receive target beam 418, and may divide the target beam at an optical coupler 426. Target interferometer 422 is typically used to generate a target signal that may depend upon a range of a target 430 from target interferometer 422. Target interferometer may accomplish this by directing one portion 428 of target beam 418 toward target 430, and the other portion 432 of target beam 418 to a target frequency difference module 434 over an optical path with a fixed path length. Portion 428 of target beam 418 may be reflected by target 430 and may be transmitted to target frequency difference module 434 via optical coupler 426 and an optical fiber 436. Based on interference between portions 436 and 432 at coupler 448, target frequency difference module 434 may generate the target signal corresponding to a beat frequency of portions 436 and 432 of target beam 418 due to the difference between their path lengths.

According to various embodiments of the invention, reference interferometer 424 may receive reference beam 420 and may generate a reference signal corresponding to a frequency difference between two portions of reference beam 424 that may be directed over two separate fixed paths with a known path length difference. More particularly, reference beam 420 may be divided by an optical coupler 440 into a first portion 442 and a second portion 444. First portion 442 may have a fixed optical path length difference relative to second portion 444. Based on interference between portions 442 and 444 at coupler 446, reference frequency difference module 450 may generate the reference signal corresponding to a beat frequency of portions 442 and 444 of reference beam 420 caused by the fixed difference between their path lengths.

As will be appreciated, target interferometer 422 and reference interferometer 424 have been illustrated and described as Mach-Zehnder interferometers. However other interferometer configurations may be utilized. For example, target interferometer 422 and reference interferometer 424 may include embodiments wherein Michaelson-Morley interferometers may be formed.

In some embodiments, system 410 may include a processor 438. Processor 438 may receive the target signal and the reference signal and may process these signals to determine the range of target 430. Range information determined based on the target signal and the reference signal may be used to determine a range rate of target 430 with respect to target interferometer 422.

Figure 5:
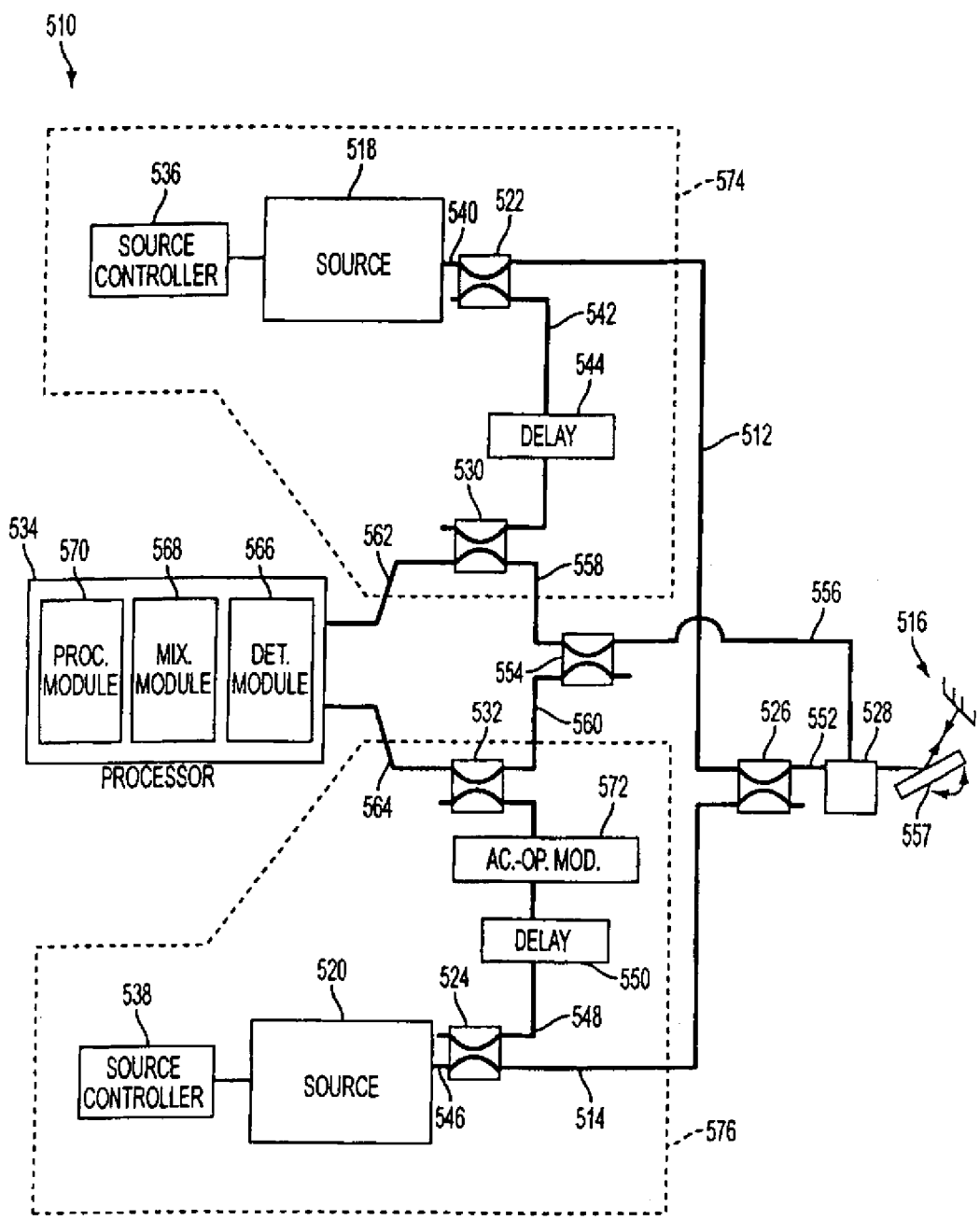
FIG. 5 illustrates a laser radar system according to one or more embodiments of the invention.

FIG. 5 illustrates an exemplary embodiment of a laser radar system 510 that employs two or more laser radar sections, each of which emits a target beam toward a target. For example, a first laser radar section 574 emits a first target beam 512 and a second laser radar section 576 emits a second target beam 514 toward a target 516. In some embodiments of the invention, first target beam 512 and second target beam 514 may be chirped to create a dual chirp system. According to various embodiments of the invention, laser section 574 may include a laser source controller 536, a first laser source 518, a first optical coupler 522, a first beam delay 544, a first local oscillator optical coupler 530, and/or other components. Second laser radar section 576 may include a laser source controller 538, a second laser source 520, a second optical coupler 524, a second beam delay 550, a second local oscillator optical coupler 532 and/or other components. For example, some or all of the components of each of laser radar sections 574 and 576 may be obtained as a coherent laser radar system from MetricVision™. Coherent laser radar systems from MetricVision™ may provide various advantages, such as enhanced linearity functionality, enhanced phase wandering correction, and other advantages to laser radar system 510 in determining the range and the range rate of target 516.

According to various embodiments of the invention, one or both of first and second laser sources 518 and 520 may include system 210 described above. Providing system 210 in first and/or second laser source 518 and 520 may enhance the operation of laser radar system 510 by increasing the coherence length of electromagnetic radiation used by laser radar system 510 to determine range and/or range rate information. For example, increased coherence length of the electromagnetic radiation may enhance a range, speed, accuracy, and/or other aspects of laser radar system 510.

In some embodiments of the invention, first target beam 512 and second target beam 514 may be reflected by target 516 back toward laser radar system 510. Laser radar system 510 may receive first target beam 512 and second target beam 514, and may determine at least one of a range of target 516 from laser radar system 510, and a range rate of target 516.

According to various embodiments of the invention, first laser source 518 may have a first carrier frequency. First laser source 518 may emit a first laser beam 540 at a first frequency. The first frequency may be modulated at a first chirp rate. The first frequency may be modulated electrically, mechanically, acousto-optically, or otherwise modulated as would be apparent. First laser beam 540 may be divided by first optical coupler 522 into first target beam 512 and a first local oscillator beam 542. First local oscillator beam 542 may be held for a first delay period at a first beam delay 544.

In some embodiments of the invention, second laser source 520 may emit a second laser beam 546 at a second frequency. The second frequency may be modulated at a second chirp rate different from the first chirp rate. The second frequency may be modulated electrically, mechanically, acousto-optically, or otherwise modulated. The first chirp rate and the second chirp rate may create a counter chirp between first laser beam 540 and second laser beam 546.

In some instances, the second carrier frequency may be substantially the same as the first carrier frequency. For example, in some embodiments the percentage difference between the first baseline frequency and the second baseline frequency is less than 0.05%. This may provide various enhancements to laser system 510, such as, for example, minimizing distortion due to speckle, or other enhancements. Second laser beam 546 may be divided by second optical coupler 524 into a second target beam 514 and a second local oscillator beam 548. Second local oscillator beam 548 may be held for a second delay period at a second beam delay 550. The second delay period may be different than the first delay period.

In some embodiments, the output(s) of first laser source 518 and/or second laser source 520 (e.g. first laser beam 540 and/or second laser beam 546) may be linearized using mechanisms provided in, for example, METRICVISION™ Model MV200. Phase wandering of the output(s) of first laser source 518 and/or second laser source 520 may corrected using mechanisms provided in, for instance, METRICVISION™ Model MV200.

In some embodiments of the invention, laser radar system 510 may determine the range and the range rate of target 516 with an increased accuracy when the range of target 516 from laser radar system 510 falls within a set of ranges between a minimum range and a maximum range. When the range of target 516 does not fall within the set of ranges, the accuracy of laser radar system 510 may be degraded.

According to various embodiments of the invention, first beam delay 544 and second beam delay 550 may be adjustable. Adjusting first beam delay 544 and second beam delay 550 may enable laser radar system 510 to be adjusted to bring the set of ranges over which more accurate determinations may be made closer to, or further away from, laser radar system 510. First beam delay 544 and the second beam delay 550 may be adjusted to ensure that the range of target 516 falls within the set of ranges between the minimum range and the maximum range so that the range and the range rate of target 516 may be determined accurately. First beam delay 544 and second beam delay 550 may be adjusted by a user, or in an automated manner.

The degradation of determinations of range and range rate when the range of target 516 is outside of the set of ranges may be a result of the finite nature of the coherence length of first laser source 518 and second laser source 520. For example, the distance between the minimum range and the maximum range may be a function of the coherence length. The longer the coherence length of first laser source 518 and second laser source 520, the greater the distance between the minimum range and the maximum range may be. Thus, increasing the coherence length of first laser source 518 and second laser source 520 may enhance range and range rate determinations by laser radar system 510 by providing the ability to make determinations over an enhanced set of ranges.

In some embodiments of the invention, first local oscillator beam 542 may be divided into a plurality of first local oscillator beams and second local oscillator beam 548 may be divided into a plurality of second local oscillator beams. In such instances, laser radar system 510 may include a plurality of beam delays that may apply delays of varying delay periods to the plurality of first local oscillator beams and the plurality of second local oscillator beams. This may ensure that one of the plurality of first local oscillator beams and one of the plurality of second local oscillator beams may have been delayed for delay periods that may enable the range and range rate of the target to determined accurately.

Accordingly, in some embodiments of the invention, first laser source 518 and second laser source 520 may emit chirped electromagnetic radiation with an enhanced coherence length. For example, first laser source 518 and/or second laser source 520 may include system 210 as illustrated in FIG. 5 and described above.

According to various embodiments, first target beam 512 and second target beam 514 may be directed and/or received from target 516 on separate optical paths. In some embodiments, these optical paths may be similar but distinct. In other embodiments, first target beam 512 and second target beam 514 may be coupled by a target optical coupler 526 into a combined target beam 552 prior to emission that may be directed toward target 516 along a common optical path. In some embodiments, combined target beam 552 (or first target beam 512 and second target beam 514, if directed toward target 516 separately) may be reflected by target 516 and may be received by laser radar system 510 along a reception optical path separate from the common optical path that directed combined target beam 552 toward target 516. Such embodiments may be labeled "bistatic." Or, combined target beam 552 may be received by laser radar system 510 as a reflected target beam 556 along the common optical path. These latter embodiments may be labeled "monostatic." Monostatic embodiments may provide advantages over their bistatic counterparts when operating with reciprocal optics. In monostatic embodiments, the common optical path may include optical member 528 that may provide a common port for emitting combined target beam 552 and receiving reflected target beam 556. Optical member 528 may include an optical circulator, an optical coupler or other optical member as would be apparent.

In some embodiments, the common optical path may include a scanning element 557. Scanning element 557 may include an optical element such as, for instance, a mirror, a lens, an antennae, or other optical elements that may be oscillated, rotated, or otherwise actuated to enable combined target beam 552 to scan target 516. In some instances, scanning element 557 may enable scanning at high speeds. In conventional systems, scanning elements may be a source of mirror differential Doppler noise effects due to speckle or other optical effects that may degrade the accuracy of these systems. However, because various embodiments of laser radar system 510 use simultaneous measurements (or substantially so) to unambiguously determine range and range rate, inaccuracies otherwise induced by high speed scanning may be avoided.

In some embodiments of the invention, a target optical coupler 554 may divide reflected target beam 556 into a first reflected target beam portion 558 and a second reflected target beam portion 560. First local oscillator optical coupler 530 may combine first local oscillator beam 542 with first reflected target beam portion 558 into a first combined target beam 562. Second local oscillator optical coupler 532 may combine second local oscillator beam 548 with second reflected target beam portion 560 into a second combined target beam 564. In some embodiments not shown in the drawings, where, for example first target beam 512 and second target beam 514 may be directed to and/or received from target 516 separately, first local oscillator optical coupler 530 may combine first target beam 512 that is reflected with first local oscillator beam 542 to create first combined target beam 562, and second target beam 514 that is reflected may be combined with second local oscillator beam 548 to create second combined target beam 564.

Because first local oscillator beam 542 and second local oscillator beam 548 may be combined with different target beams, or different portions of the same target beam (e.g. reflected target beam 556), first combined target beam 562 and second combined target beam 564 may represent optical signals that would be present in two separate, but coincident, single laser source frequency modulated laser radar systems, just prior to final processing. For example, laser source controller 536, first laser source 518, first optical coupler 522, first beam delay 544, and first local oscillator optical coupler 530 may be viewed as a first laser radar section 574 that may generate first combined target beam 562 separate from second combined target beam 564 that may be generated by a second laser radar section 576. Second laser radar section 576 may include laser source controller 538, second laser source 520, second optical coupler 524, second beam delay 550, and second local oscillator optical coupler 532.

In some embodiments, laser radar system 510 may include a processor 534. Processor 534 may include a detection module 566, a mixing module 568, a processing module 570, and/or other modules. The modules may be implemented in hardware (including optical and detection components), software, firmware, or a combination of hardware, software, and/or firmware. Processor 534 may receive first combined target beam 562 and second combined target beam 564. Based on first combined target beam 562 and second combined target beam 564, processor 534 may generate the range signal and the range rate signal. Based on the range signal and the range rate signal, the range and the range rate of target 516 may be unambiguously determined.

In some embodiments of the invention, processor 534 may determine a first beat frequency of first combined local oscillator beam 562. The first beat frequency may include a difference in frequency, attributable to a difference in path length, of first local oscillator beam 542 and the component of reflected target beam 556 that corresponds to first target beam 512 that has been reflected from target 516. Processor 534 may determine a second beat frequency of second combined local oscillator beam 564. The second beat frequency may include a difference in frequency, attributable to a difference in path length, of second local oscillator beam 548 and the component of reflected target beam 556 that corresponds to second target beam 514 that has been reflected from target 516. The first beat frequency and the second beat frequency may be determined simultaneously (or substantially so) to cancel noise introduced by environmental or other effects. One or more steps may be taken to enable the first beat frequency and the second beat frequency to be distinguished from other frequency components within first combined target beam 562, other frequency components within second combined target beam 564, and/or each other. For example, these measures may include using two separate chirp rates as the first chirp rate and the second chirp rate, delaying first local oscillator beam 542 and second local oscillator beam 550 for different delay times at first beam delay 544 and second beam delay 550, respectively, or other measures may be taken.

It will be appreciated that while FIG. 5 illustrates an exemplary embodiment of the invention implemented primarily using optical fibers and optical couplers, this embodiment is in no way intended to be limiting. Alternate embodiments within the scope of the invention exist in which other optical elements such as, for example, prisms, mirrors, half-mirrors, beam splitters, dichroic films, dichroic prisms, lenses, or other optical elements may be used to direct, combine, direct, focus, diffuse, amplify, or otherwise process electromagnetic radiation.

According to various embodiments of the invention, processor 534 may mix first combined target beam 562 and second combined target beam 564 to produce a mixed signal. The mixed signal may include a beat frequency sum component that may correspond to the sum of the first beat frequency and the second beat frequency, and a beat frequency difference component that may correspond to the difference between the first beat frequency and the second beat frequency. For a target having constant velocity, first laser beam 540 and second laser beam 546 beat frequencies may be described as follows:

$$f_1(t) = \frac{4\pi v}{\lambda_1} + 2\pi\gamma_1(R - RO_1), \tag{1}$$

and $$f_2(t) = \frac{4\pi v}{\lambda_2} + 2\pi\gamma_2(R - RO_2), \tag{2}$$

respectively, where $f_1(t)$ represents the first beat frequency, $f_2(t)$ represents the second beat frequency, $\lambda_1$ and $\lambda_2$ are the two optical wavelengths, v is the target velocity, $\gamma_1$ and $\gamma_2$ are proportional to the respective chirp rates, R is the measured range and $RO_1$ and $RO_2$ represent the range offsets for the two laser radars. Assuming that $\lambda_1 = \lambda_2 = \lambda$, we may subtract the equations to yield $$f_1(t) - f_2(t) = 2\pi R(\gamma_1 - \gamma_2) - 2\pi(\gamma_1 RO_1 - \gamma_2 RO_2) \tag{3}$$

Rearranging (3) we obtain $$R = \frac{(f_1(t) - f_2(t))}{2\pi(\gamma_1 - \gamma_2)} + \frac{(\gamma_1 RO_1 - \gamma_2 RO_2)}{(\gamma_1 - \gamma_2)} \tag{4}$$

as the corrected range measurement. Similarly, we may combine (1) and (2) to obtain the expression, $$v = \frac{\lambda}{4\pi}\left(\frac{f_1(t) - \frac{\gamma_1}{\gamma_2}f_2(t)}{1 - \frac{\gamma_1}{\gamma_2}}\right) + \frac{\lambda\gamma_1}{2}\left(\frac{RO_1 - RO_2}{1 - \frac{\gamma_1}{\gamma_2}}\right), \tag{5}$$

which provides a measure of the target velocity.

According to various embodiments of the invention, the beat frequency sum component, described above in Equation 4, may be filtered from the mixed signal to produce a range signal. From the beat frequency sum component included in the range signal (e.g. f1(t)+f2(t)), a determination of the distance from laser radar system 510 to target 516 may be made. The determination based on the range signal may be unambiguous, and may not depend on either the instantaneous behavior, or the average behavior of the Doppler frequency shift (e.g. v/λ).

In some embodiments, the beat frequency difference component, described above in Equation 4, may be filtered from the mixed signal to produce a range rate signal. From the beat frequency difference component included in the range rate signal, a determination of the range rate of target 516 may be unambiguously made. To determine the range rate of target 516, $$f_1(t) - \frac{\gamma_1}{\gamma_2} f_2(t)$$

may be represented as a value proportional to a chirp rate difference between the first chirp rate and the second chirp rate. This may enable the Doppler shift information to be extracted, which may represent an instantaneous velocity of target 516.

In some embodiments of the invention, the second chirp rate may be set to zero. In other words, second laser source 518 may emit radiation at a constant frequency. This may enable second laser source 518 to be implemented with a simpler design, a small footprint, a lighter weight, a decreased cost, or other enhancements that may provide advantages to the overall system. In such embodiments, laser radar system 510 may include a frequency shifting device. The frequency shifting device may include an acousto-optical modulator 572, or other device. Acousto-optical modulator 572 may provide a frequency offset to second local oscillator beam 548, which may enhance downstream processing. For example, the frequency offset may enable a stationary target beat frequency between second local oscillator beam 548 and second reflected target beam portion 560 representative of a range rate of a stationary target to be offset from zero so that the a direction of the target's movement, as well as a magnitude of the rate of the movement, may be determined from the beat frequency. This embodiment of the invention has the further advantage that it may allow for continuous monitoring of the target range rate, uninterrupted by chirp turn-around or fly-back. Chirp turn-around or fly-back may create time intervals during which accurate measurements may be impossible for a chirped laser radar section. In these embodiments, laser radar section 576 may only determine the range rate of target 516 while laser radar system 510 retains the ability to measure both range and range rate.

Figure 6:
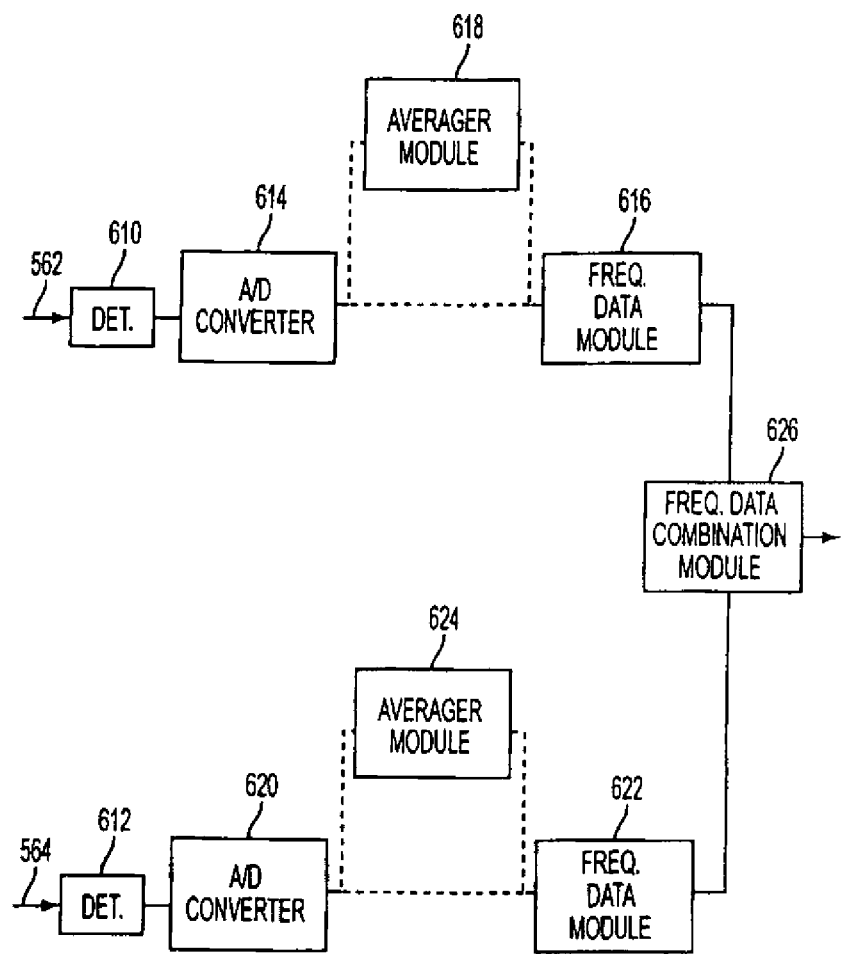
FIG. 6 illustrates a processor that digitally mixes two combined target beams according to one or more embodiments of the invention.

FIG. 6 illustrates a processor 534 according to one embodiment of the invention. Processor 534 may mix first combined target beam 562 and second combined target beam 564 digitally. For example, processor 534 may include a first detector 610 and a second detector 612. The first detector 610 may receive first combined target beam 562 and may generate a first analog signal that corresponds to first combined target beam 562. The first analog signal may be converted to a first digital signal by a first converter 614. Processor 534 may include a first frequency data module 616 that may determine a first set of frequency data that corresponds to one or more frequency components of the first digital signal. In some instances, the first digital signal may be averaged at a first averager module 618. In such instances, the averaged first digital signal may then be transmitted to first frequency data module 616.

Second detector 612 may receive second combined target beam 564 and may generate a second analog signal that corresponds to second combined target beam 564. The second analog signal may be converted to a second digital signal by a second converter 620. Processor 534 may include a second frequency data module 622 that may determine a second set of frequency data that corresponds to one or more of frequency components of the second digital signal. In some instances, the second digital signal may be averaged at a second averager module 624. In such instances, the averaged second digital signal may then be transmitted to second frequency data module 622.

The first set of frequency data and the second set of frequency data may be received by a frequency data combination module 626. Frequency data combination module 626 may linearly combine the first set of frequency data and the second set of frequency data, and may generate a range rate signal and a range signal derived from the mixed frequency data.

Figure 7:
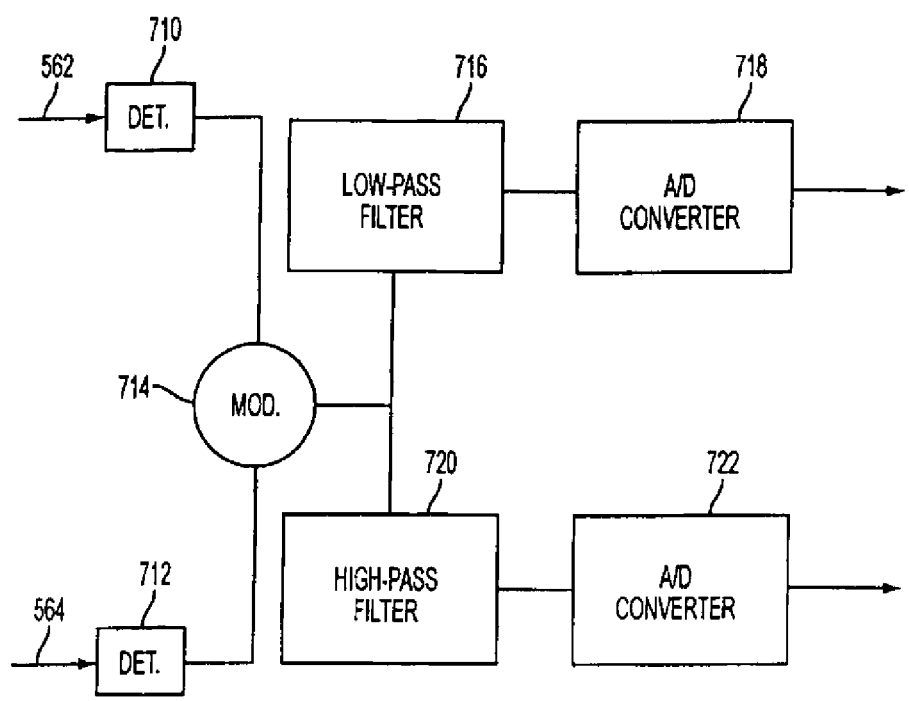
FIG. 7 illustrates a processor that electrically mixes two combined target beams according to one or more embodiments of the invention.

FIG. 7 illustrates a processor 534 according to another embodiment of the invention. Processor 534 may include a first detector 710 and a second detector 712 that may receive first combined target beam 562 and second combined target beam 564, respectively. First detector 710 and second detector 712 may generate a first analog signal and a second analog signal associated with first combined target beam 562 and second combined target beam 564, respectively. Processor 534 may mix first combined target beam 562 and second combined target beam 564 electronically to generate the range signal and the range rate signal. For example, processor 534 may include a modulator 714. Modulator 714 may multiply the first analog signal generated by first detector 710 and the second analog signal generated by second detector 712 to create a combined analog signal. In such embodiments, processor 534 may include a first filter 716 and a second filter 718 that receive the combined analog signal. First filter 716 may filter the combined analog signal to generate a first filtered signal. In some instances, first filter 716 may include a low-pass filter. The first filtered signal may be converted by a first converter 720 to generate the range rate signal. Second filter 718 may filter the combined analog signal to generate a second filtered signal. For instance, second filter 718 may include a high-pass filter. The second filtered signal may be converted by a second converter 722 to generate the range signal.

Figure 8:
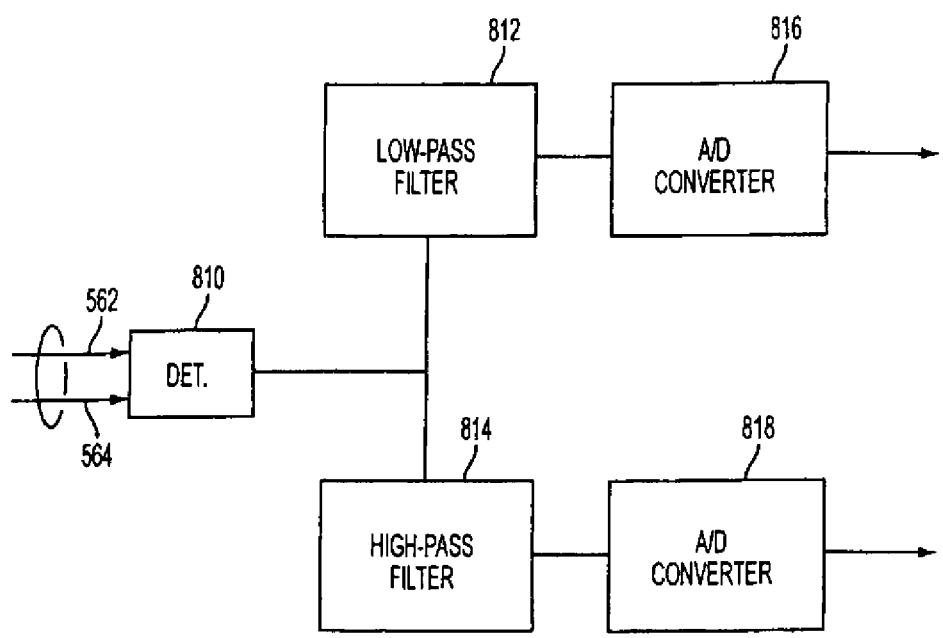
FIG. 8 illustrates a processor that optically mixes two combined target beams according to one or more embodiments of the invention.

FIG. 8 illustrates a processor 534 according to yet another embodiment of the invention. Processor 534 may mix first combined target beam 562 and second combined target beam 564 optically to generate the range signal and the range rate signal. For example, processor 534 may include a detector 810 that receives first combined target beam 562 and second combined target beam 564 and generates a combined analog signal based on the detection. In such embodiments, processor 534 may include a first filter 812 and a second filter 814 that receive the combined analog signal. First filter 812 may filter the combined analog signal to generate a first filtered signal. First filter 812 may include a low-pass filter. The first filtered signal may be converted by a first converter 816 to generate the range rate signal. Second filter 814 may filter the combined analog signal to generate a second filtered signal. Second filter 14 may include a high-pass filter. The second filtered signal may be converted by a second converter 818 to generate the range signal.

While the invention has been described herein in terms of various embodiments, it is not so limited and is limited only by the scope of the following claims, as would be apparent to one skilled in the art.

What is claimed is:

1. A system for controllably chirping electromagnetic radiation, the system comprising:
 a first coherent laser radar section comprising:
  a laser source that generates a first laser beam,
  an interferometer that splits the first laser beam into a first target beam and a first local oscillator beam, and generates a first combined target beam from a first reflected portion of the first target beam and the first local oscillator beam;

a second coherent laser radar section comprising:
  a laser source that generates a second laser beam,
  an interferometer that splits the second laser beam into a second target beam, incident on the target at the same location as the first target beam, and a second local oscillator beam, and generates a second combined target beam from a second reflected portion of the second target beam and the second local oscillator beam; and
a processor configured to determine a range and a Doppler velocity of the target unambiguously from the first combined target beam and the second combined target beam,
wherein each of the first laser source and the second laser source further comprises:
at least one optical element that forms an optical cavity;
a frequency shifter disposed within the optical cavity, wherein the frequency shifter receives electromagnetic radiation from the optical cavity, and outputs a frequency shifted portion of the received electromagnetic radiation back to the optical cavity; and
an optical switch disposed within the optical cavity, the optical switch having an input coupled to the optical cavity, the optical switch having a first output and a second output, and the optical switch being configured in a first state to dump substantially all of the received electromagnetic radiation from the input away from the optical cavitiy via the first output, and the optical switch being configured in a second state to return substantially all of the received electromagnetic radiation form the input back to the optical cavity via the second output,
wherein, while the optical switch is configured in the second state, the frequency of the electromagnetic radiation within the optical cavity linearly shifts further and further away from the initial frequency as the electromagnetic radiation is circulated through the optical cavity, and
wherein the optical switch is configured in the first state for a period of time that is greater than or substantially equal to a period of time required from electromagnetic radiation to travel the optical length of the optical cavity thereby returning the frequency of the electromagnetic radiation within the optical cavity to the initial frequency.

2. The system of claim 1, wherein the optical switch receives electromagnetic radiation from a radiation source, and is controllable to either dump the electromagnetic radiation received from the radiation source away from the optical cavity or to direct the electromagnetic radiation received from the radiation source into the optical cavity.

3. The system of claim 2, wherein when the optical switch returns the electromagnetic radiation received from the optical cavity back to the optical cavity, the optical switch dumps the electromagnetic radiation received from the radiation source.

4. The system of claim 1, further comprising an optical amplifier.

5. The system of claim 4, wherein the optical amplifier has a gain large enough to overcome one or more cavity losses of the optical cavity.

6. The system of claim 1, wherein a portion of the electromagnetic radiation within the optical cavity is output from the optical cavity to a device.

7. The system of claim 6, wherein the portion of the electromagnetic radiation within the optical cavity that is output from the optical cavity is output from frequency shifter to the device.

8. The system of claim 7, wherein the frequency shifter receives electromagnetic radiation from the optical cavity, and diffracts the received electromagnetic radiation such that the portion of the electromagnetic radiation that is output from the optical cavity is zero order diffracted by the frequency shifter.

9. The system of claim 1, wherein the frequency shifter receives electromagnetic radiation from the optical cavity, and diffracts the received electromagnetic radiation such that the frequency shifted portion of the received electromagnetic radiation that is output back to the optical cavity is first order diffracted by the frequency shifter.

10. The system of claim 1, wherein the optical cavity comprises a ring cavity.

11. The system of claim 1, wherein the at least one optical element comprises at least one of a mirror, a lens, a prism, or an optical fiber.

12. The system of claim 1, wherein the optical switch is controllable to dump the received electromagnetic radiation away from the optical cavity for a period of time that is substantially equal to the optical length of the optical cavity.

13. The system of claim 1, wherein the frequency shifter comprises an acousto-optic Bragg cell.

* * * * *